US009818142B2

(12) United States Patent
Wang et al.

(10) Patent No.: US 9,818,142 B2
(45) Date of Patent: Nov. 14, 2017

(54) RANKING PRODUCT SEARCH RESULTS (71) Applicant: Alibaba Group Holding Limited, George Town (KY)

(72) Inventors: Yi Wang, Hangzhou (CN); Anxiang Zeng, Hangzhou (CN)

(73) Assignee: Alibaba Group Holding Limited (KY)

( * ) Notice: Subject to any disclaimer, the term of this patent is extended or adjusted under 35 U.S.C. 154(b) by 688 days.

(21) Appl. No.: 14/222,254

(22) Filed: Mar. 21, 2014

(65) Prior Publication Data

US 2014/0297476 A1  Oct. 2, 2014

(30) Foreign Application Priority Data

Mar. 28, 2013 (CN) .......................... 2013 1 0105175

(51) Int. Cl.
*G06Q 30/00* (2012.01)
*G06F 17/30* (2006.01)
*G06Q 30/06* (2012.01)

(52) U.S. Cl.
CPC ..... *G06Q 30/0625* (2013.01); *G06F 17/3053* (2013.01); *G06F 17/30699* (2013.01); *G06F 17/30867* (2013.01)

(58) Field of Classification Search
CPC ................................................. G06Q 30/0625
See application file for complete search history.

(56) References Cited

U.S. PATENT DOCUMENTS

| 7,246,110 | B1 | 7/2007 | Musgrove et al. |
| 7,925,651 | B2 | 4/2011 | Burges et al. |
| 9,454,582 | B1* | 9/2016 | Tirumalareddy ... G06F 17/3053 |
| 2005/0144162 | A1* | 6/2005 | Liang ................ G06F 17/30109 |
| 2008/0255925 | A1 | 10/2008 | Vailaya et al. |
| 2010/0076911 | A1 | 3/2010 | Xu et al. |

FOREIGN PATENT DOCUMENTS

JP   2012203821 A   10/2012
WO   WO-2012097124 A1   7/2012

OTHER PUBLICATIONS

Thorsten Joachims. "Optimizing search engines using clickthrough data." Proceedings of the eighth ACM SIGKDD international conference on Knowledge discovery and data mining. ACM, 2002.
Cao et al. "Adapting ranking SVM to document retrieval." Proceedings of the 29th annual international ACM SIGIR conference on Research and development in information retrieval. ACM, 2006.
Tie-Yan Liu. "Learning to rank for information retrieval." Foundations and Trends in Information Retrieval 3.3 (2009): 225-331.

* cited by examiner

*Primary Examiner* — Kathleen Palavecino
(74) *Attorney, Agent, or Firm* — Van Pelt, Yi & James LLP (57) ABSTRACT Ranking product search results is disclosed, including: determining a plurality of sample pairs corresponding to a query word; determining a plurality of feature score values corresponding to a set of ranking features associated with the query word for each product associated with each of at least a subset of the plurality of sample pairs; and determining a set of weightings corresponding to the set of ranking features based at least in part on the plurality of feature score values and ranking priority assignments corresponding to the at least subset of the plurality of sample pairs.

13 Claims, 8 Drawing Sheets

RANKING PRODUCT SEARCH RESULTS

CROSS REFERENCE TO OTHER APPLICATIONS

This application claims priority to People's Republic of China Patent Application No. 201310105175.4 entitled A METHOD AND SYSTEM FOR SORTING SEARCH ENGINE RESULTS, filed Mar. 28, 2013 which is incorporated herein by reference for all purposes.

FIELD OF THE INVENTION

The present invention involves the field of data processing. In particular, it involves techniques for ranking product search results.

BACKGROUND OF THE INVENTION

At e-commerce websites, the effectiveness of search ranking significantly affects the searching and shopping user experiences. In search engine systems, many factors affect the ranking of search results. Such factors include user feedback and user search action data, which are iteratively collected and analyzed to improve the product ranking technique. These factors affect online ranking results using a specific combination of weightings. Conventionally, product search engines use one ranking model to rank products found for any search query. A ranking model includes weightings associated with respective features.

Typically, in product search result ranking models, assessment mechanisms are established targeting multiple ranking features, such as product quality, product text matching, product category click matching, product price matching, and product sales volume. Behind each assessment mechanism, all products are assessed by either an algorithmic model or expert knowledge, and the assessments are embodied in the form of feature score values with respect to the ranking features for the products. Score values comprise the fundamental features of the ranking model.

During online ranking in actual application of these fundamental features, targeting a product list returned by a specific query, the product scores which serve as the basis for product ranking are obtained after determining the weighted sum of the feature score values of the product ranking features. Because the feature score values of different ranking features have different weightings, the determination of the weightings will effectively determine how products will be ranked on the search results page. In one example, the feature score values for product sales volume and product category could have higher weightings because those features represent content about which the user is directly concerned. In another example, a lower weighting may be assigned to the feature score value that assesses text matching.

Conventionally, all online ranking of products simultaneously use one set of rank weightings. This set of rank weightings is selected using a specialized knowledge of experts using A/B testing to perform online verification of the rank weightings. In the optimization of search engine ranking results, A/B testing refers to the technique of comparing the merits and drawbacks of different optimization algorithms. For example, all query traffic in the system is divided into a number of equal portions. One portion of the query traffic is selected to serve as the basic test traffic and the existing system algorithm is invoked to rank the search results. Then, user feedback action data associated with the product rankings by the existing system algorithm is obtained to compute ranking effectiveness of the existing system algorithm. For the other equal portions of query traffic, a new optimized algorithm is used to rank the search results. Then, user feedback action data is obtained to compute ranking effectiveness of the new optimized algorithm. In this way, through comparison testing of different algorithms over a period of time, the comparative ranking effectiveness results of different ranking algorithms can be obtained. Based on the comparative results, the weightings used by the search ranking algorithm with the best ranking effectiveness can be implemented.

However, this weightings selection technique has at least the following defects:

(1) Currently, once the weightings for existing features are determined, the weightings are typically not subsequently adjusted over time. However, as time passes, previously determined weightings may no longer suit the current products to be ranked in search results.

(2) As the scope of product coverage increases, one set of uniform online weightings may no longer satisfy the ranking of all products, and a single model is no longer able to fully maximize returns on products in all categories. In other words, the weightings that are appropriate for products in a certain industry or category may not be appropriate for products in another industry or category.

(3) Because online weightings are usually determined using the existing specialized knowledge of experts, the ranking model is unable to learn autonomously and update automatically. At the same time, the determination of each set of weightings must undergo multiple rounds of A/B testing, which, due to lack of experience and knowledge, could result in excessively lengthy testing time or poor test effectiveness. Moreover, during this process, vast development and testing resources are expended, while adjustment and testing of the weightings could potentially affect overall search returns.

All of the three problems above could result in poorer search ranking results and may thereby detrimentally affect online transactions.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of ranking product search results are described herein. Sample pairs corresponding to a query word are determined based at least in part on historical user action data associated with the query word. Each sample pair includes two products that have been responsive to one or more previous search requests that included the query word. Each sample pair also includes an indication that one of the products of the sample pair is associated with a higher ranking priority. A ranking model comprising a set of weightings corresponding to a set of ranking features associated with the query word is determined based at least in part on the sample pairs. The ranking model is used to rank one or more products responsive to a subsequently received search request that includes the query word.

Figure 1:
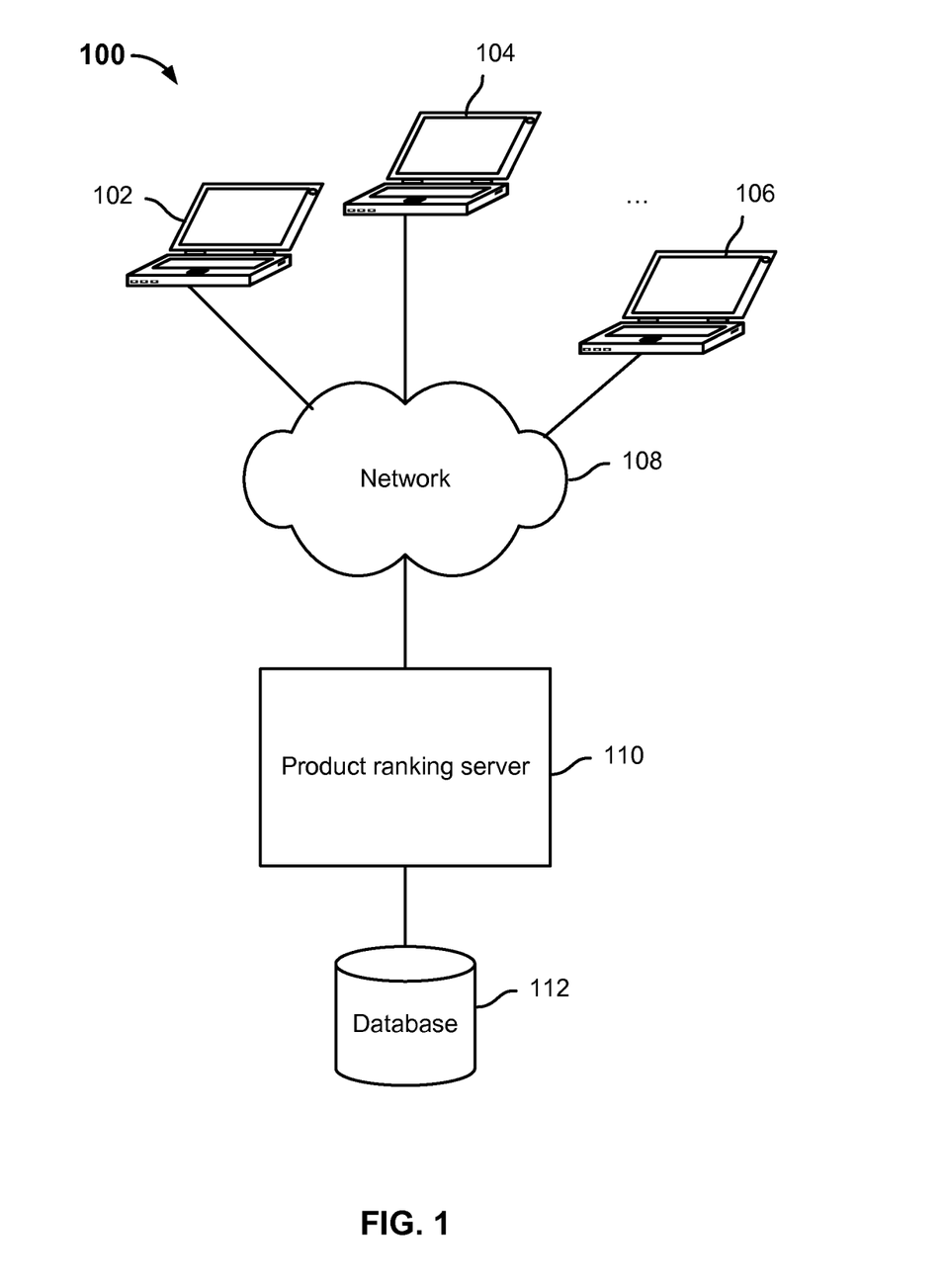
FIG. 1 is a diagram showing an embodiment of a system for ranking product search results.

FIG. 1 is a diagram showing an embodiment of a system for ranking product search results. In the example, system 100 includes client device 102, client device 104, client device 106, network 108, product ranking server 110, and database 112. Network 108 includes high-speed networks and/or data networks. Client devices 102, 104, and 106 communicate with product ranking server 110 over network 108.

While client devices 102, 104, and 106 are shown to be laptops in the example, each of client devices 102, 104, and 106 may be a desktop computer, a mobile device, a tablet device, a smart phone, or any other computing device. Product ranking server 110 is associated with an e-commerce website (e.g., that can be supported by product ranking server 110 or a separate web server). In response to search requests submitted at (e.g., a search engine of) the e-commerce website by users using client devices such as client devices 102, 104, and 106, product ranking server 110 is configured to obtain product search results (e.g., stored at database 112), rank the product search results, and return at least a portion of the ranked product search results. Product ranking server 110 ranks products based at least in part on using a set of ranking features associated with a query word to extract feature score values from each product, determine a ranking score based on the feature score values for each product, and rank the products based on their corresponding ranking scores. Product ranking server 110 also stores logs (e.g., selection logs, access logs, purchase logs) regarding user action data with respect to the products displayed among the search results. Product ranking server 110 can store such historical user action data at database 112.

As will be described in further detail below, in order to optimize product search result rankings to increase either click-through rates of search results and/or conversion rates, product ranking server 110 can use the historical user action data to determine a set of weightings corresponding to respective ones of a set of ranking features associated with a particular query word or a category of query words. The determined set of weightings corresponding to respective ones of a set of ranking features associated with a particular query word or category of query words can be used by product ranking server 110 to improve the rankings of product search results that are returned for subsequent search requests that include the particular query word or are associated with the category of query words.

Figure 2:
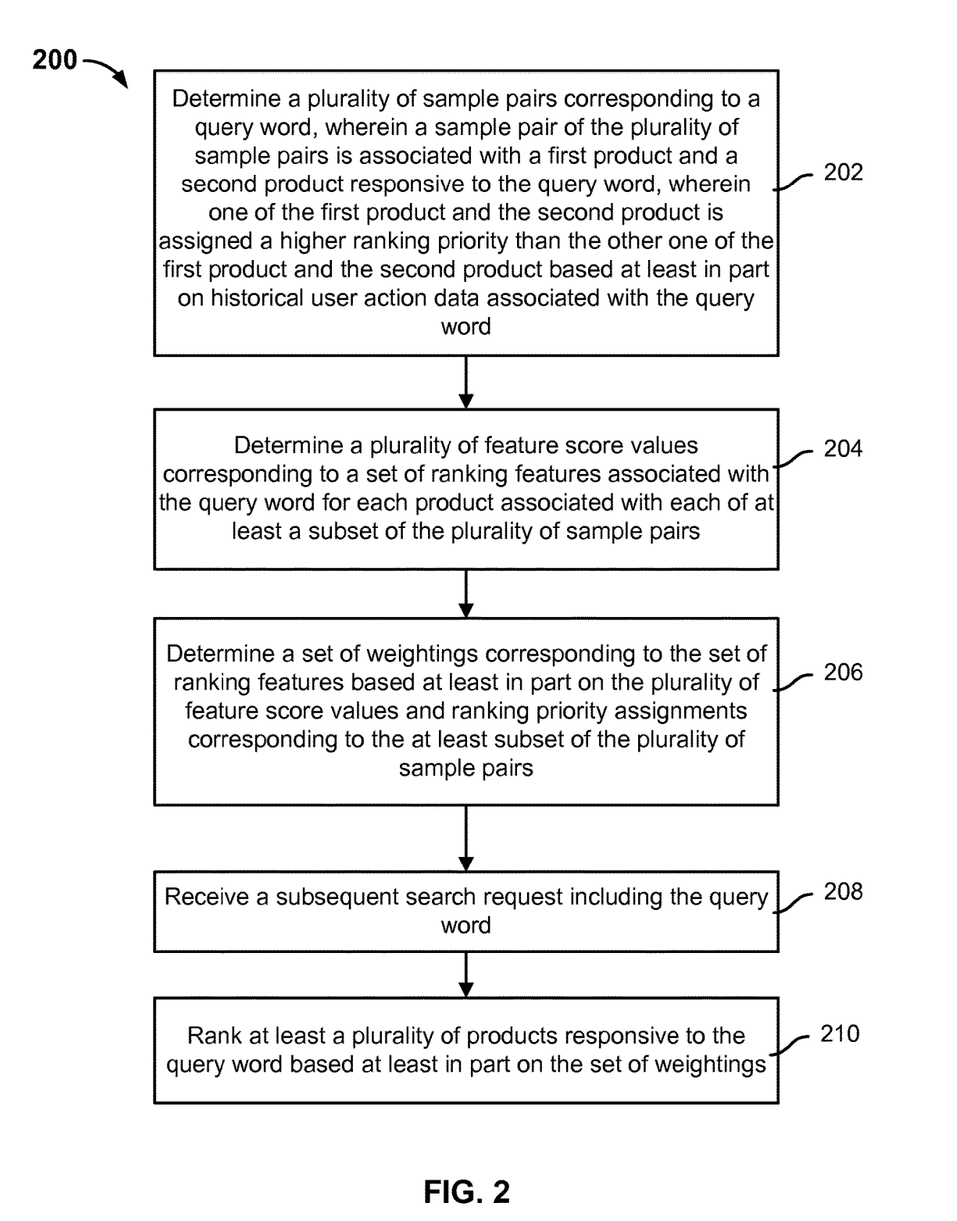
FIG. 2 is a flow diagram showing an embodiment of a process for ranking product search results.

FIG. 2 is a flow diagram showing an embodiment of a process for ranking product search results. In some embodiments, process 200 is implemented at system 100 of FIG. 1.

At 202, a plurality of sample pairs corresponding to a query word is determined, wherein a sample pair of the plurality of sample pairs is associated with a first product and a second product responsive to the query word, wherein one of the first product and the second product is assigned a higher ranking priority based at least in part on historical user action data associated with the query word.

A query word comprises a word that can be included in a search query submitted to a search engine. For example, the search engine is associated with an e-commerce website and can be configured to return one or more products available at the e-commerce website that are responsive to the search query. Information pertaining to the one or more responsive products is presented for the searching user at a search results page (e.g., associated with the e-commerce website). Assuming that the query word has been previously searched for at the search engine, historical user action data associated with the query word exists and is retrieved. Historical user action data associated with a query word comprises data associated with actions (e.g., selections, purchases, accesses) that users have made with respect to products that were presented at previous search results pages returned for a search based on the query word.

For example, the historical user action data can be determined from search engine's access logs, selection (e.g., click) logs, and purchase logs. Each of an access log, click log, and/or purchase log is associated with a time at which the log was generated or stored. In some embodiments, a predetermined historical period is configured by a system administrator. Each product that was responsive to (e.g., determined to match) a search query including the query word within the predetermined historical period is determined from the historical user action data and at least one historical metric is determined for each such product based on the historical user action data. Examples of a historical metric include a click-through rate and a conversion rate. The "click-through rate" of a product responsive to the query word refers to the ratio of the number of times that the product has been selected (e.g., clicked on) by a user at a search results page generated for the query word over the total number of searches conducted using the query word. The "conversion rate" of a product responsive to the query word refers to the ratio of the number of times that the product has been purchased (e.g., clicked on) by a user after selecting the product at a search results page generated for the query word over the total number of searches conducted using the query word.

Different pairs of products that have been responsive to a search query including the query word are determined and each pair of products that meets a configured condition is considered a "sample pair." For example, the configured condition can be that if the difference between the respective historical metrics of (e.g., click-through rate or conversion rate) a pair of products exceeds a configured threshold. The product of a sample pair associated with the higher historical metric is assigned a higher ranking priority relative to the other product and the product of the sample pair associated with the lower historical metric is referred to as being of a lower ranking priority relative to the former product. The relative ranking priorities indicate that the product of a sample pair with the higher ranking priority than the other product of the sample pair should be ranked higher than the other product of the sample pair if both products are among returned product search results. Thus, each sample pair denotes the relative ranking priorities of the two products that are associated with the sample pair.

For example, a sample pair includes product A and product B. In the example, product A is assigned a higher ranking priority than product B. Therefore, a sample pair indicates that if products A and B were included among product search results returned for a query word, product A should be ranked above product B (though not necessarily immediately above).

An example process of determining sample pairs is described below with FIG. 3.

At 204, a plurality of feature score values corresponding to a set of ranking features associated with the query word is determined for each product associated with each of at least a subset of the plurality of sample pairs.

A set of ranking features may be predetermined for each query word or each category of query words. In some embodiments, the same set of ranking features may be associated with different query words or different categories of query words. A ranking feature describes an attribute of a product responsive to the query word or a category of query words. Examples of ranking features include product quality, product text matching, product category click matching, product price matching, and product sales volume. Extracting a ranking feature from a product refers to determining an attribute value or a combination of multiple attribute values (the attribute value or combination of attribute values is sometimes referred to as a "feature score value") based at least in part on the product or metadata associated with the product corresponding to that ranking feature.

For each sample pair, a feature score value corresponding to each ranking feature of the set of ranking features is determined for each of the two products of the sample pair. For example, if there are five ranking features, then five corresponding feature score values are determined for each of the two products of a sample pair based on metadata associated with that product.

An example process of determining feature score values for each product of each sample pair is described below with FIG. 4.

At 206, a set of weightings corresponding to the set of ranking features is determined based at least in part on the plurality of feature score values and ranking priority assignments corresponding to the at least subset of the plurality of sample pairs.

Sample pair information including feature score values corresponding to each product and also data associated with whether the product is assigned the higher or the lower ranking priority of the two products in a sample pair are used as training and/or testing data to determine a ranking model. A model is trained on sample pair information including the feature score values of various sample pairs of products and the relative ranking priorities between two products of each sample pair determined based on a historical metric (e.g., click-through rate or conversion rate) to learn which ranking features/feature score values of a product leads to a higher metric and should therefore be assigned a higher weighting. By training the model on relative ranking priorities of two products in a sample pair, the model can compare the feature score values associated with the higher ranking priority product to the feature score values of the lower ranking priority product. A ranking model comprises a weighting corresponding to each ranking feature of the set of ranking feature values associated with the query word. The resulting weightings of the ranking model corresponding to respective ones of the set of ranking features are intended to result in higher ranking scores for products with feature score values that are historically associated with a higher historical metric (e.g., click-through rate or conversion rate) and/or higher ranking priorities over other products.

For example, in some embodiments, the machine learning model of Ranking Support Vector Machine (Ranking SVM) is used to obtain the desired ranking model. Ranking SVM receives pair-wise inputs. Thus, in some embodiments, a Ranking SVM model is trained, using known techniques, with information associated with sample pairs, where the information associated with each sample pair includes the feature score values and the relative ranking priority corresponding to each product of the sample pair to obtain a ranking model. Other machine learning models are used in other embodiments.

The resulting set of weightings corresponding to respective ones of the set of ranking features associated with the query word is stored and is to be retrieved to rank product search results to be returned for a subsequent search request including the query word.

Because assignments of higher priority or lower priority corresponding to each product of a sample pair are determined based on historical click-through rates or conversion rates, by training the machine learning model using such sample data, the resulting set of weightings should optimize the ranking of search result products such that click-through rates or conversion rates are increased.

In some embodiments, sample pairs that are associated with a particular query word are used to obtain a ranking model for that query word. In some embodiments, sample pairs that are associated with one or more query words associated with a particular category are used to obtain the ranking model for that category of query words. Where a ranking model is desired for each category of query words, the training data is divided into different groups; each group of training data includes the sample pairs associated with one or more query words of a particular category. Then each category's particular group of training data is used separately to train a machine learning model and to obtain a ranking model for that category.

An example process of determining a set of weightings corresponding to the set of ranking features is described below with FIG. 5.

At 208, a subsequent search request including the query word is received.

A subsequent search request including the query word is received (e.g., at the search engine associated with the e-commerce website). In response to receiving the query word in the search request, a set of products that are responsive to the query word is found.

At 210, a plurality of products responsive to the query word is ranked based at least in part on the set of weightings.

The set of products that is responsive to the query word is to be presented at a search results page for the user. Prior to presenting the products at the search results page, the products are first ranked. In various embodiments, the set of found products is ranked based at least in part on the stored set of weightings corresponding to respective ones of the set of ranking features associated with the particular query word or a category associated with the query word. For each product of the set of found products, feature score values corresponding to respective ones of the set of ranking features are determined. Then, each such feature score value is weighted (e.g., multiplied) by its corresponding weighting included in the retrieved set of weightings and the weighted feature score values of a product are summed to result in a ranking score. The set of found products are ranked at least in part on these ranking scores. A predetermined number of top ranking products are returned for the user at the search results page and presented in their determined ranking sequence.

Figure 3:
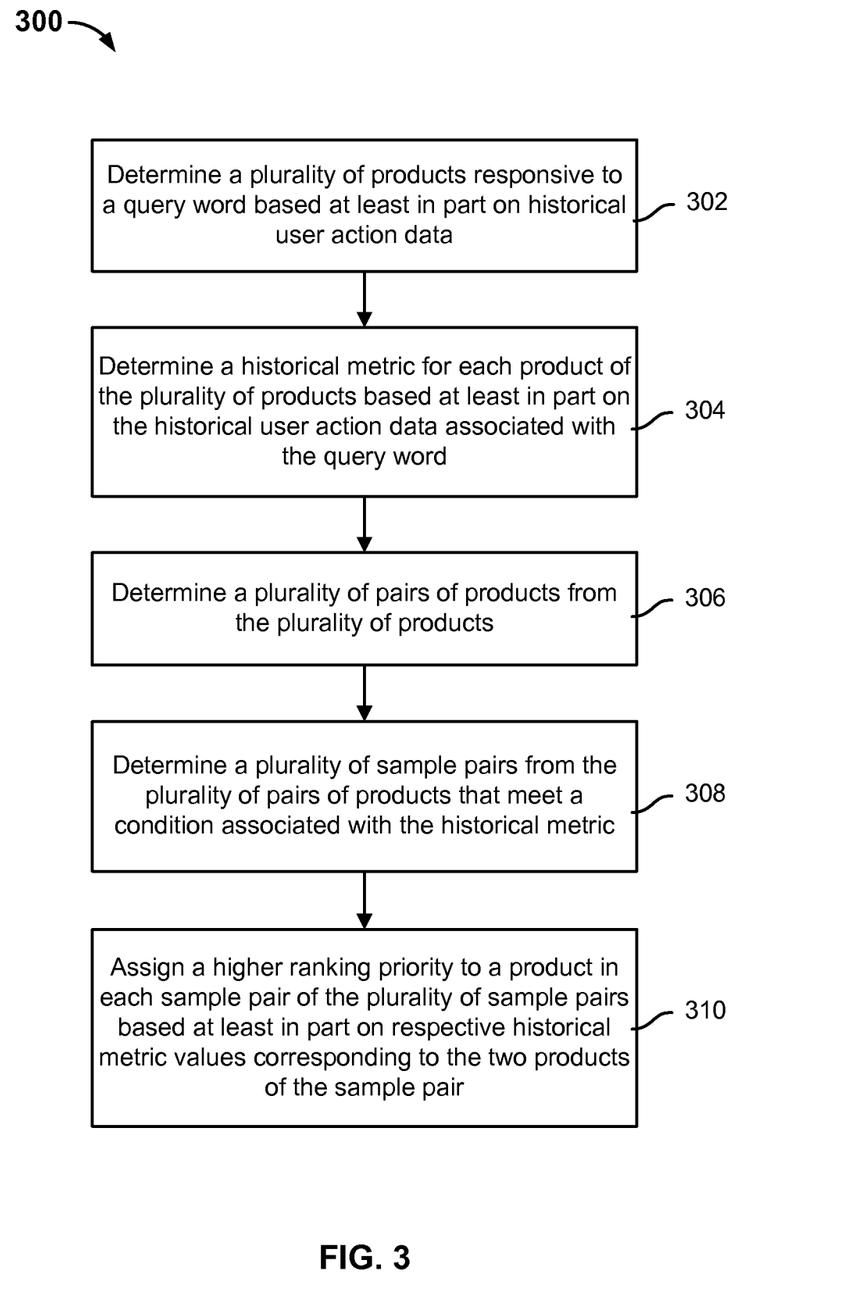
FIG. 3 is a flow diagram showing an example of a process of determining sample pairs associated with a query word.

FIG. 3 is a flow diagram showing an example of a process of determining sample pairs associated with a query word. In some embodiments, process 300 is implemented at system 100 of FIG. 1. In some embodiments, step 202 of process 200 of FIG. 2 is implemented with process 300.

Process 300 describes an example process of determining sample pairs with respect to a query word. Process 300 may be repeated for each of a plurality of query words that has been previously included in search requests (e.g., at an e-commerce website).

At 302, a plurality of products responsive to a query word is determined based at least in part on historical user action data. Each product that has been previously responsive to the query word can be determined from historical user action data. Historical user action data includes a search engine's access logs, selection (e.g., click) logs, and purchase logs. In some embodiments, only historical user action data associated with a predetermined previous period (e.g., the past seven days) is used to determine the products.

At 304, a historical metric is determined for each product of the plurality of products based at least in part on the historical user action data associated with the query word. In some embodiments, in order to increase click-through rates or conversion rates for product search results returned for the query word, the weighting for each ranking feature of a set of ranking features associated with the query word is optimized. In some embodiments, machine learning is used to establish a relational model of the ranking features and ranking results by estimating the weightings for the various ranking features based on the training data.

As described above, the "click-through rate" of a product responsive to the query word refers to the ratio of the number of times that the product has been selected (e.g., clicked on) by a user at a search results page generated for the query word over the total number of searches conducted using the query word. The "conversion rate" of a product responsive to the query word refers to the ratio of the number of times that the product has been purchased (e.g., clicked on) by a user after selecting the product at a search results page generated for the query word over the total number of searches conducted using the query word.

The sample sets to use to train the machine learning model are extracted based on an improvement objective. For example, if the primary objective is to increase the click-through rates (which are sometimes referred to as "CTR") of product search results responsive to the query word, then historical user selection actions can be used as the historical metric for determining sample pairs. In another example, the primary objective is to increase conversion rates, then historical user purchase actions can be used as the historical metric for determining sample pairs.

A historical metric is determined for each product that has been previously responsive to the query word. In some embodiments, only historical user action data associated with a predetermined previous period (e.g., the past seven days) is used to determine the historical metric. The historical metric can be user configured. For example, the historical metric can be a click-through rate or a conversion rate, depending on whether the primary objective is to optimize product search result rankings to increase click-through rates or conversion rates, respectively.

At 306, a plurality of pairs of products is determined from the plurality of products. In various embodiments, all possible pairs of products, each of which has been previously responsive to the query word, are determined. Such pairs of products are candidates for sample pairs of the query word.

At 308, a plurality of sample pairs from the plurality of pairs of products that meet a condition associated with the historical metric is determined. The condition that a pair of products is required to meet to be considered a sample pair may be based on a comparison between their respective historical metrics (e.g., click-through rates or conversion rates). In some embodiments, the condition is that if the absolute value of the difference between the respective historical metrics of the two products of the pair exceeds a cutoff threshold, the pair of products is considered a sample pair associated with the query word. In some embodiments, the cutoff threshold is determined as the mean of the absolute values of the differences of every pair of products.

The following is an example of determining the cutoff threshold, where the historical metric used is click-through rate, and determining sample pairs uses the cutoff threshold:

If the products previously responsive to the query word include product A, product B, and product C, and associated with this query word, the click-through rate for product A is CTR A, the click-through rate for product B is CTR B, and the click-through rate for product C is CTR C, then, first, the difference between CTR A and CTR B, the difference between CTR A and CTR C, and the difference between CTR C and CTR B are computed separately, where the mean of the absolute values of these differences is used as the cutoff threshold.

Those of the pairs of products, {A, B}, {A, C}, and {B, C}, will be considered a sample pair associated with the query word if the absolute value of the difference in the click-through rates of the respective products of the pair exceeds the cutoff threshold. For example, product pair {A, B} will be considered a sample pair if |CTR A−CTR B|>cutoff threshold. If a product pair's absolute value of the difference of the click-through rates does not exceed the cutoff threshold, that product pair will not be considered a sample pair and therefore will not be used as training data for the machine learning process.

While the historical metric of click-through rate was described in the example above for determining the cutoff threshold and determining sample pairs using the cutoff threshold, the same types of computations can be applied to other types of historical metrics, such as the conversion rate.

At 310, a higher ranking priority is assigned to a product in each sample pair of the plurality of sample pairs based at least in part on respective historical metric values corresponding to the two products of the sample pair. In various embodiments, the product of a sample pair that has the higher historical metric (e.g., the higher click-through rate or the higher conversion rate) is assigned a higher ranking priority in the sample pair. The other product of the sample pair, the product with the lower historical metric, is assigned a lower ranking priority in the sample pair. The higher ranking priority product of the sample pair is assumed to be closer to the user's search intentions and therefore has a higher correlation to the query word. The higher ranking priority of a product within a sample pair indicates that the product should be ranked higher than the other product of the sample pair in a search results page. The assignments of higher and lower ranking priority to products is performed per each sample pair, which means a first product may be assigned a higher ranking priority in one sample pair but may be assigned a lower ranking priority in a different sample pair. It is possible that historically, a product of a sample pair that is assigned a lower ranking priority relative to the other product of the sample pair may have actually been ranked higher than the other product in a product search results page. The plurality of sample pairs may be stored as a sample set for the query word.

For example, a sample pair of the sample set associated with the query word can be expressed using the representation (query, product1, product2), where query comprises the query word and products product1 and product2 comprise the identifiers of two products that have been previously included in product search results page(s) in response to a search query that included query. In conventional ranking models, sample training is achieved by manually tagging the samples. The disadvantages of such practice are that it is laborious and inefficient. The embodiments described herein use a pair-wise technique, such that extracted sample pairs need only be tagged for which of the two products in the sample pair has a higher ranking priority over the other product in the sample pair. Embodiments described herein do not require determining the relative ranking priority of each product over every other product.

In some embodiments, a category to which the query word belongs is predetermined (e.g., configured by a system administrator). In some embodiments, each sample pair generated for a query word may be tagged with the category identifier associated with the category that was predetermined for the query word. Therefore, in some embodiments, a set of weightings corresponding to a set of ranking features can be determined for each category of query words (rather than for each query word) based on the sample pairs generated for each query word belonging to that category.

Figure 4:
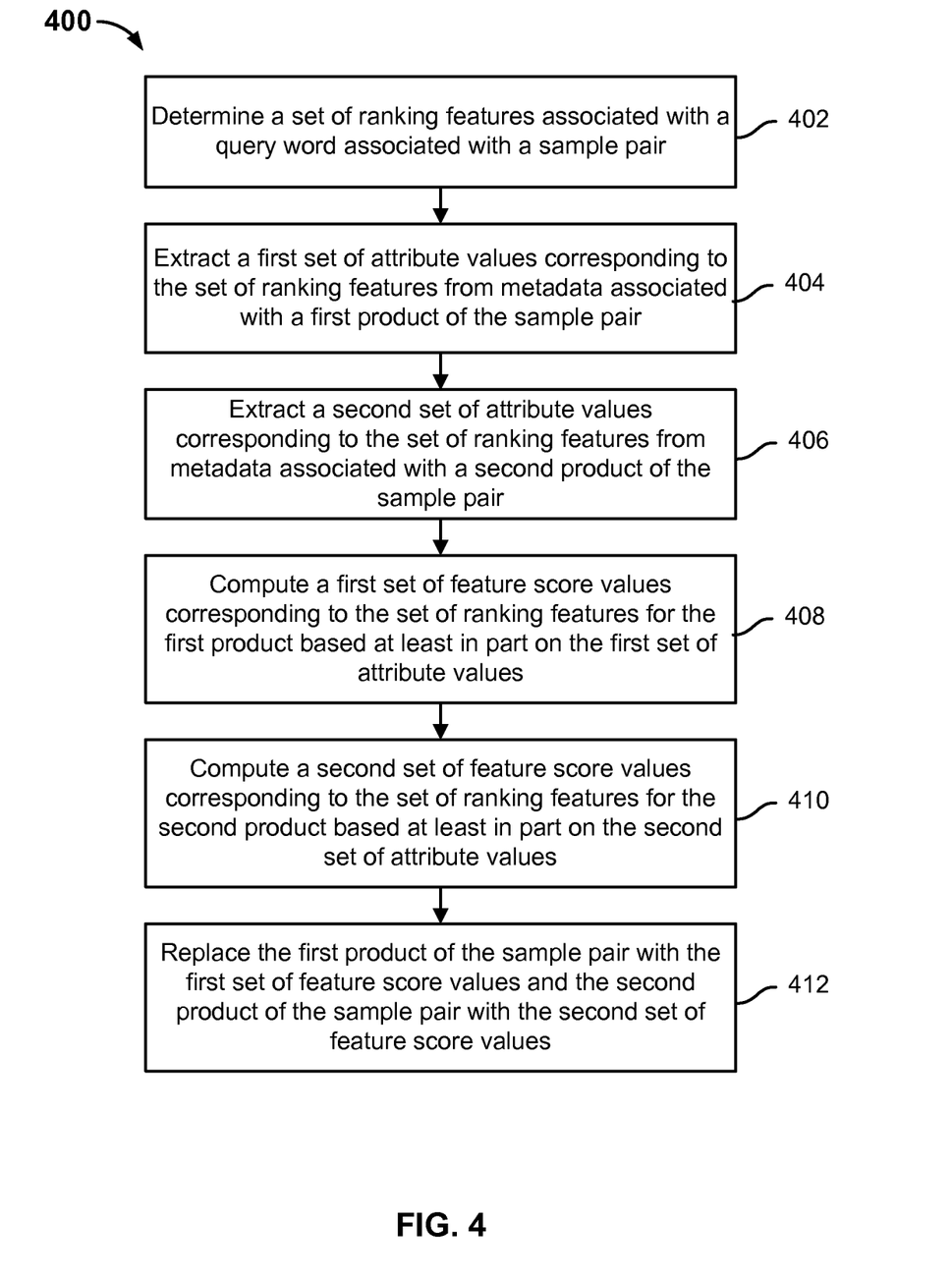
FIG. 4 is a flow diagram showing an example of a process for determining feature score values corresponding to a set of ranking features associated with the query word corresponding to each product of a sample pair.

FIG. 4 is a flow diagram showing an example of a process for determining feature score values corresponding to a set of ranking features associated with the query word corresponding to each product of a sample pair. In some embodiments, process 400 is implemented at system 100 of FIG. 1. In some embodiments, step 204 of process 200 of FIG. 2 can be implemented with process 400.

At 402, a set of ranking features associated with a query word associated with a sample pair is determined. Assume that in process 400, a plurality of sample pairs has already been determined for a query word (e.g., using a process such as process 300 of FIG. 3). The set of ranking features associated with the query word may be predetermined.

In some embodiments, if the sample pair has been tagged with a category identifier associated with the query word, then query word parsing information, category distribution information corresponding to the query word, and other information corresponding to the query word may also be retrieved from storage.

At 404, a first set of attribute values corresponding to the set of ranking features is extracted from metadata associated with a first product of the sample pair. A set of metadata associated with each product may be stored in a database. In some embodiments, a set of metadata may comprise product information submitted by a seller user associated with the corresponding product. In some embodiments, a set of metadata includes historical user actions with respect to the corresponding product (e.g., the number of past purchases, the number of past views). The set of metadata associated with a product may include various different attribute values (e.g., numerical values) associated with the product. Examples of an attribute include a price, a number of days since the product has been released, and a number of times that the product has been historically purchased. In some embodiments, a ranking feature of the set of ranking features may correspond to one or more attribute values of the set of metadata of the product. The correspondences between attribute values of the product and a particular ranking feature may be predetermined.

The attribute values of a first product (of a sample pair) corresponding to each ranking feature will be extracted from the set of metadata and used to compute the first product's corresponding feature score value for that ranking feature.

At 406, a second set of attribute values corresponding to the set of ranking features is extracted from metadata associated with a second product of the sample pair. The attribute values of a second product (of the sample pair) corresponding to each ranking feature will be extracted from the set of metadata and used to compute the second product's corresponding feature score value for that ranking feature.

At 408, a first set of feature score values corresponding to the set of ranking features is computed for the first product based at least in part on the first set of attribute values. As described with 404, one or more corresponding attribute values of the first product of the sample pair were extracted for each ranking feature and therefore, the feature score value for that ranking feature can be computed based on combining the one or more corresponding attribute values.

At 410, a second set of feature score values corresponding to the set of ranking features is determined for the second product based at least in part on the second set of attribute values. As described with 406, one or more corresponding attribute values of the second product of the sample pair were extracted for each ranking feature and therefore, the feature score value for that ranking feature can be computed based on the one or more corresponding attribute values.

At 412, the first product of the sample pair is replaced with the first set of feature score values and the second product of the sample pair is replaced with the second set of feature score values. The sample pair previously included the query word and identifiers corresponding to each of the two products of the sample pair. However, the identifier of the first product in the sample pair is replaced by its corresponding computed feature score values and the identifier of the second product in the sample pair is replaced by its corresponding computed feature score values.

For example, for the sample pair representation (query, product1, product2), the identifier of the first product, product1, is replaced with the feature score values of the first product, (feature1_1, feature2_1, feature3_1, ..., featureN_1) and the identifier of the second product, product2, is replaced with the feature score values of the second product, (feature1_2, feature2_2, feature3_2, ..., featureN_2), where there are N ranking features. Thus, the resulting representation of the sample pair after the product identifiers are replaced with the products' feature score values can be (query, (feature1_1, feature2_1, feature3_1, ..., featureN_1), (feature1_2, feature2_2, feature3_2, ..., featureN_2)).

Figure 5:
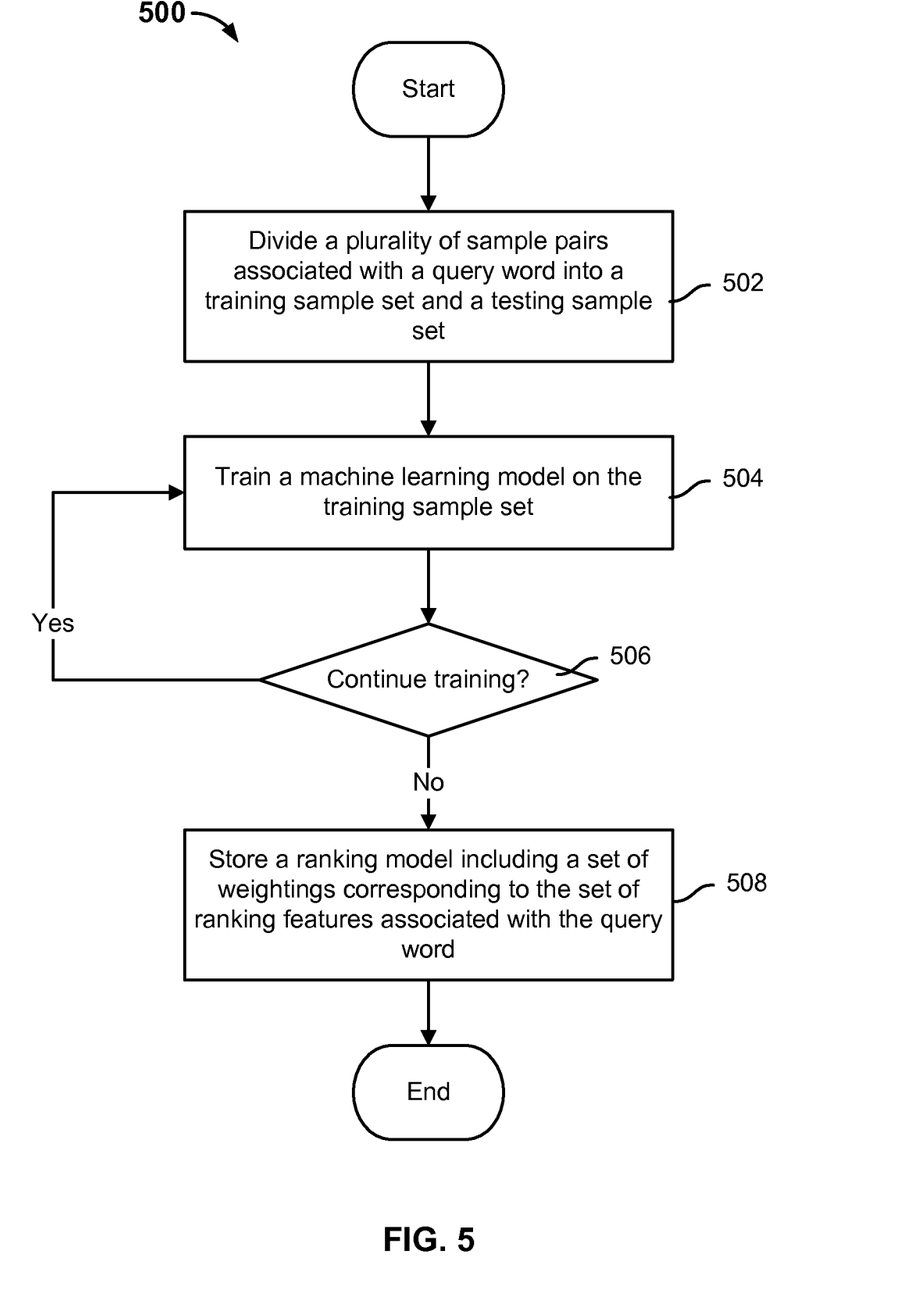
FIG. 5 is a flow diagram showing an example process of determining weightings corresponding to a set of ranking features associated with a query word.

FIG. 5 is a flow diagram showing an example process of determining weightings corresponding to a set of ranking features associated with a query word. In some embodiments, process 500 is implemented at system 100 of FIG. 1. In some embodiments, step 206 of process of 200 of FIG. 2 is implemented with process 500.

At 502, a plurality of sample pairs associated with a query word is divided into a training sample set and a testing sample set. In some embodiments, the sample set on which a ranking model is to be built is split, based on a predetermined ratio (for example, without limitation, 2:1), into a training sample set and a testing sample set. Each sample pair of the sample set includes the query word and the feature score values corresponding to both products of the sample pair.

At 504, a machine learning model is trained on the training sample set.

Training of a machine learning model based on the feature score values with respect to the various ranking features of the products included in each sample pair and the respective higher and lower ranking priority indications of the two products included in each sample pair within the training sample is performed to obtain a corresponding weighting for the each ranking feature to serve as the model's output results. The greater the weighting that is determined for a particular ranking feature, the more important that ranking feature is determined to be.

At 506, it is determined whether to continue training. In the event it is determined to continue training the machine learning model, control returns to 504. Otherwise, in the event it is determined to no longer train the machine learning model, control is transferred to 508.

In some embodiments, the testing sample set is used to perform accuracy testing of the model's output results. If it is determined that the model's output results do not meet a desired condition, then control returns to 504 to continue to train the machine learning model with the training sample set. Repetition of steps 504 and 506 are performed until the desired condition (e.g., a level of accuracy) is achieved.

At 508, a ranking model including a set of weightings corresponding to a set of ranking features associated with the query word is stored. The output results of the model when the desired condition of training the model is achieved serve as the set of weightings for the set of ranking features.

In some embodiments, without limitation, Ranking Support Vector Machine (Ranking SVM) may be used as the technique for training the model using the training sample set. Ranking SVM is a pair-wise ranking and classification technique, which can learn from a set of pair-wise ranked samples of feature score values associated with a query word to determine a ranking model (i.e., set of weightings corresponding to respective ones of the set of ranking features). Because Ranking SVM was developed based on the Support Vector Machine (SVM) technique, it supports classification using various kernel functions, including Gaussian kernels, polynomial kernels, and linear kernels. Gaussian kernels and polynomial kernels can convert low-dimensional problems to high-dimensional problems so as to increase the accuracy of the models. However, the training speeds are relatively slow and the complexity is higher when predicting online with regard to the models of these two kernels. Meanwhile, although the generalization capacity of linear kernels is relatively weak, their training speeds are relatively quick, and linear ranking methods are easily integrated, relatively, into present-day systems. Therefore, embodiments described here use linear kernels.

In some embodiments, list-wise techniques to obtain multi-objective integration and optimization can be employed in model training in order to increase the accuracy of model predictions.

In some embodiments that use Ranking SVM, sample pairs are converted into the specific sample format required by the Ranking SVM technique. To conform to the specific sample format required by the Ranking SVM technique, a sample pair is converted into a list with two entries, where each entry includes the feature score values of a product of the sample pair and also an indication associated with the higher or lower ranking priority assignment of that product relative to the other product of the sample pair. An example of the list of feature score values for the ranking features of the two products, product1 and product2, contained in a sample pair is shown below, where "1" and "0" are the identifiers used to express the relative ranking sequence of the two products within the sample pair. In the example below of the format of the sample pair converted into the list format associated with Ranking SVM, the product, product1, having the identifier "1" is the product that is assigned the higher ranking priority and the product, product2, having the identifier "0" is the product that is assigned the lower ranking priority:

(1, feature1_1, feature2_1, feature3_1, ..., featureN_1)
(0, feature1_2, feature2_2, feature3_2, ..., featureN_2)

Each sample pair is converted into the sample format required by the Ranking SVM technique and used to build the desired ranking model.

In some other embodiments, if sample pairs associated with different query words were used to train a ranking model, then each sample pair can be tagged with the identifier of the category of its query word. Then, the sample pairs can be divided into groups, where each group is associated with a different category. A machine learning model may be separately trained based on each category of sample pairs and so a different ranking model (i.e., a different set of weightings) may be determined and stored for each category. As such, the same products ranked by different ranking models associated with different categories may result in different ranking sequences.

Figure 6:
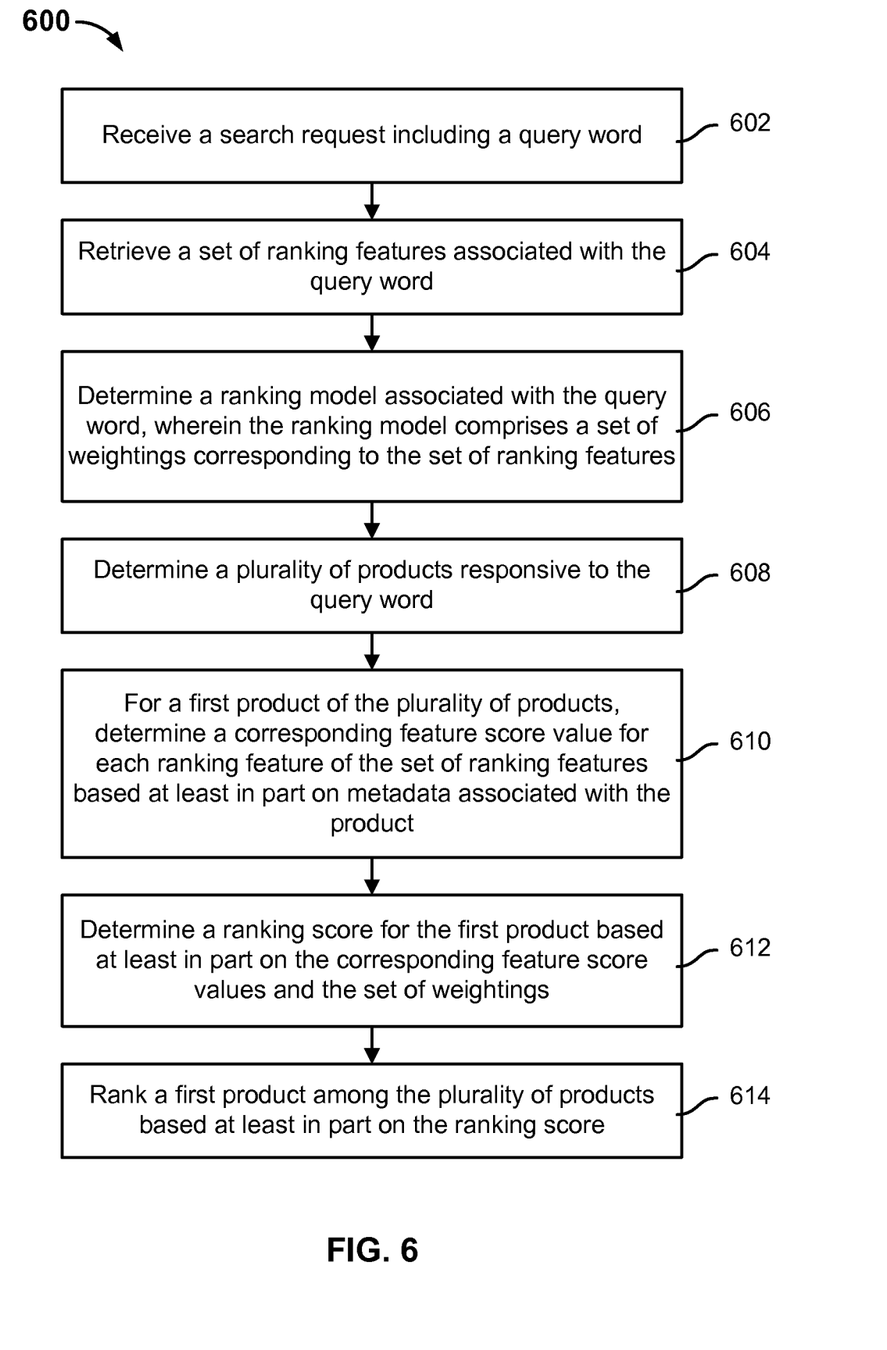
FIG. 6 is a flow diagram showing an example of providing ranking of product search results responsive to a search request.

FIG. 6 is a flow diagram showing an example of providing ranking of product search results responsive to a search request. In some embodiments, process 600 is implemented at system 100 of FIG. 1. In some embodiments, at least steps 208 and 210 of process 200 of FIG. 2 are implemented using process 600.

At 602, a search request including a query word is received. For example, the search request is received at a search engine associated with an e-commerce website.

At 604, a set of ranking features associated with the query word is retrieved. The predetermined set of ranking features associated with the query word or the category associated with the query word is retrieved from storage.

At 606, a ranking model associated with the query word is determined, wherein the ranking model comprises a set of weightings corresponding to the set of ranking features. In some embodiments, a ranking model has been determined for the particular query word. In some embodiments, a ranking model has been determined for a category predetermined to be associated with the query word. For example, the set of weighting associated with the retrieved ranking model associated with either the query word or the category of the query word can be represented as (weighting_1, weighting_2, weighting_3, . . . , weighting_N), where N represents the number of ranking features in the set.

At 608, a plurality of products responsive to the query word is determined. For example, products that are available at the e-commerce website are stored in a database. The database of products can be queried for those that are responsive to the query word.

At 610, for a first product of the plurality of products, a corresponding feature score value is determined for each ranking feature of the set of ranking features based at least in part on metadata associated with the product. For each product that is responsive to the query word, a corresponding feature score value is determined for each ranking feature. For example, to determine the feature score value corresponding to a ranking feature for a product, one or more attribute values included in the metadata of the product that corresponds to the ranking feature may be first determined. Then, the one or more attribute values can be combined to determine the feature score value. For example, the feature score values for a product corresponding to respective ones of the ranking features of the retrieved ranking model can be represented as (feature_1, feature_2, feature_3, . . . , feature_N), where N represents the number of ranking features in the set.

At 612, a ranking score is determined for the first product based at least in part on the corresponding feature score values and the set of weightings. For each product, each of its corresponding feature score values is multiplied with the weighting of its respective ranking feature to determine a weighted feature score value. The weighted feature score values corresponding to each product are summed together to determine the ranking score of that product.

The following is an example formula for determining the ranking score of a product:

$$\text{Ranking\_score\_}P_m = \sum_{i=1}^{N}(\text{feature\_}i\_P_m * \text{weighting\_}i) \quad (1)$$

Where $P_m$ represents product m, Ranking_score_$P_m$ represents the ranking score of product m, feature_i_$P_m$ represents the feature score value of product m corresponding to ranking feature i, weighting_i represents the weighting value of ranking feature i, and N represents the number of ranking features.

At 614, the first product is ranked among the plurality of products based at least in part on the ranking score. Once the ranking scores have been determined for the products, the products can be ranked according to their respective ranking scores. Products with higher ranking scores can be displayed earlier for the user at the product search results page than products with lower ranking scores. At least a portion of the ranked products can be returned and presented to the user.

Figure 7:
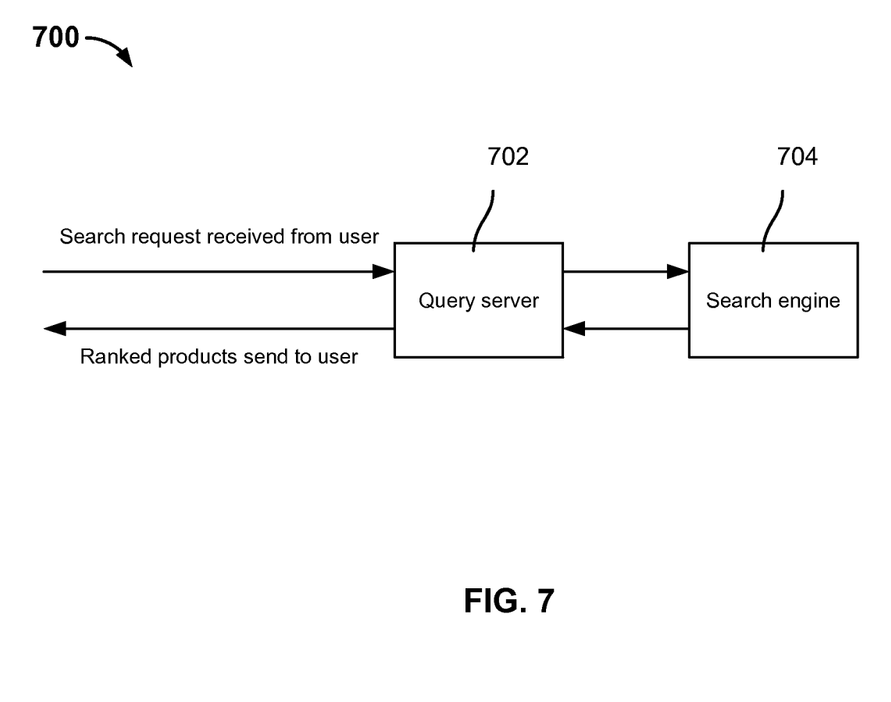
FIG. 7 is a diagram showing an embodiment of a system for ranking product search results.

FIG. 7 is a diagram showing an embodiment of a system for ranking product search results. In some embodiments, process 600 of FIG. 6 can be implemented at system 700. As shown in the example, a search request including a query word is received from a user (e.g., via input into an input field of a webpage) at query server 702. In an example of FIG. 7, the query word is "mobile phone handset." Query server 702 transmits at least the query word included in the search request to search engine 704. In the example of FIG. 7, search engine 704 is configured to first determine a category associated with the query word and then retrieve a ranking model associated with the category based on predetermined correspondences between categories and ranking models. For example, a category of a query word can be associated with a different industry. Examples of ranking models associated with different categories include a service industry ranking model, a manufacturing industry ranking model, and a retail industry ranking model. In another example, search engine 704 is configured to retrieve a ranking model associated with the query word. Search engine 704 is configured to find products that are responsive to "mobile phone handset," rank such products based on the retrieved ranking model, and return at least a portion of the ranked products to be presented for the user.

Figure 8:
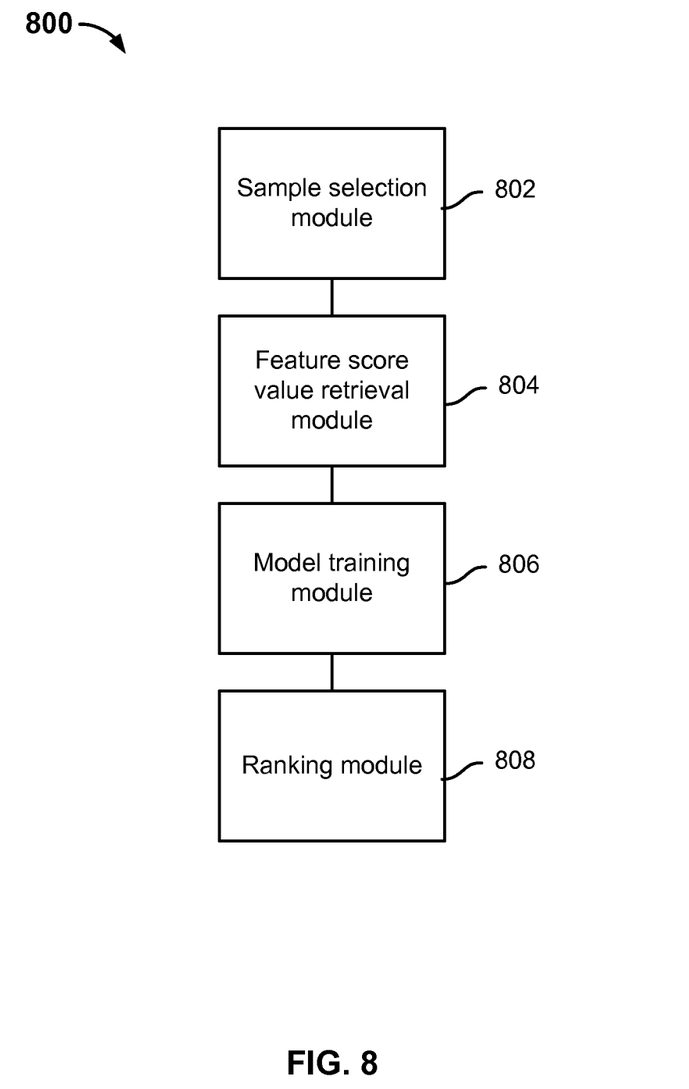
FIG. 8 is a diagram showing an embodiment of a system for ranking product search results.

FIG. 8 is a diagram showing an embodiment of a system for ranking product search results. In the example, system 800 includes sample selection module 802, feature score value retrieval module 804, model training module 806, and ranking module 808.

The modules can be implemented as software components executing on one or more processors, as hardware such as programmable logic devices and/or Application Specific Integrated Circuits designed to elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices.

Sample selection module 802 is configured to determine a plurality of sample pairs corresponding to a query word. A sample pair of the plurality of sample pairs is associated with a first product and a second product responsive to the query word and one of the first product and the second product is assigned a higher ranking priority based at least in part on historical user action data associated with the query word.

Feature score value retrieval module 804 is configured to determine a plurality of feature score values corresponding to a set of ranking features associated with the query word corresponding to each product associated with each of at least a subset of the plurality of sample pairs.

Model training module 806 is configured to determine a set of weightings corresponding to the set of ranking features associated with the query word based at least in part on training a machine learning model using the plurality of feature score values.

Ranking module 808 is configured to receive a subsequent search request including the query word. Ranking module 808 is configured to rank at least a plurality of products responsive to the query word based at least in part on the set of weightings.

Persons of ordinary skill in the art are able to understand that all or portions of the steps in the embodiments described above may be realized using programs instructing the relevant hardware, and said programs can be stored on computer-readable storage media, such as a read-only memory, hard disk or compact disc. Optionally, all or portions of the steps of the embodiments described above may also be realized using one or multiple integrated circuits. Accordingly, the various modules/units contained in the embodiments above may also be realized in the form of hardware or software function modules. Thus, the present application is not limited to any specific combination of hardware and software.

The present application may have a variety of other embodiments and, without departing from the spirit and substance of the present application, persons skilled in the art may produce a variety of corresponding changes and modifications based on the present application, but these corresponding changes and modifications shall all fall within the scope of protection of the claims of this application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
determine a plurality of sample pairs corresponding to a query word, wherein a sample pair of the plurality of sample pairs is associated with a first product and a second product responsive to the query word, wherein one of the first product and the second product is assigned a higher ranking priority than the other one of the first product and the second product based at least in part on historical user action data associated with the query word, wherein to determine the plurality of sample pairs corresponding to the query word includes to:
determine a plurality of products responsive to the query word based at least in part on the historical user action data associated with the query word;
determine a historical metric value for each product of the plurality of products based at least in part on the historical user action data associated with the query word;
determine a plurality of pairs of products from the plurality of products;
determine the plurality of sample pairs from the plurality of pairs of products, wherein each of the plurality of sample pairs meets a condition associated with the historical metric value; and
assign a higher priority to a product in each sample pair of the plurality of sample pairs based at least in part on respective historical metric values corresponding to the two products of the sample pair;
determine a plurality of feature score values corresponding to a set of ranking features associated with the query word for each product associated with each of at least a subset of the plurality of sample pairs;
determine a set of weightings corresponding to the set of ranking features based at least in part on the plurality of feature score values and ranking priority assignments corresponding to the at least subset of the plurality of sample pairs, wherein to determine the set of weightings corresponding to the set of ranking features includes to train a machine learning model based at least in part on the plurality of feature score values and indications of higher ranking priority or lower ranking priority corresponding to the two products of each sample pair of the plurality of sample pairs;
receive a subsequent search request including the query word;
rank at least the plurality of products responsive to the query word based at least in part on the set of weightings; and
output one or more ranked product search results; and
one or more memories coupled to the one or more processors and configured to provide instructions to the one or more processors.

2. The system of claim 1, wherein to rank the at least plurality of products includes to:
determine, for a product of the plurality of products, a corresponding feature score value for each ranking feature of the set of ranking features;
determine a ranking score for the product based at least in part on the corresponding feature score values and the set of weightings; and
rank the product among the plurality of products based at least in part on the ranking score.

3. The system of claim 1, wherein the historical metric values comprise one or more of the following: a conversion rate and a click-through rate.

4. The system of claim 1, wherein to determine the plurality of feature score values corresponding to the set of ranking features associated with the query word corresponding to each product associated with each of the at least subset of the plurality of sample pairs includes to:
extract a set of attribute values corresponding to the set of ranking features associated with the product; and
compute the plurality of feature score values for the product based at least in part on the set of attribute values.

5. The system of claim 1, wherein the set of ranking features associated with the query word is associated with a category to which the query word belongs.

6. The system of claim 1, wherein the historical user action data includes one or more of the following: access logs, purchase logs, or selection logs.

7. A method, comprising:
determining a plurality of sample pairs corresponding to a query word, wherein a sample pair of the plurality of sample pairs is associated with a first product and a second product responsive to the query word, wherein one of the first product and the second product is assigned a higher ranking priority than the other one of the first product and the second product based at least in part on historical user action data associated with the query word, wherein determining the plurality of sample pairs corresponding to the query word includes:
determining a plurality of products responsive to the query word based at least in part on the historical user action data associated with the query word;
determining a historical metric value for each product of the plurality of products based at least in part on the historical user action data associated with the query word;
determining a plurality of pairs of products from the plurality of products;
determining the plurality of sample pairs from the plurality of pairs of products, wherein each of the plurality of sample pairs meets a condition associated with the historical metric value; and
assigning a higher priority to a product in each sample pair of the plurality of sample pairs based at least in part on respective historical metric values corresponding to the two products of the sample pair;

determining a plurality of feature score values corresponding to a set of ranking features associated with the query word for each product associated with each of at least a subset of the plurality of sample pairs;

determining a set of weightings corresponding to the set of ranking features based at least in part on the plurality of feature score values and ranking priority assignments corresponding to the at least subset of the plurality of sample pairs, wherein determining the set of weightings corresponding to the set of ranking features includes training a machine learning model based at least in part on the plurality of feature score values and indications of higher ranking priority or lower ranking priority corresponding to the two products of each sample pair of the plurality of sample pairs;

receiving a subsequent search request including the query word;

ranking at least the plurality of products responsive to the query word based at least in part on the set of weightings; and outputting one or more ranked product search results.

8. The method of claim 7, wherein ranking the at least plurality of products includes:

determining, for a product of the plurality of products, a corresponding feature score value for each ranking feature of the set of ranking features;

determining a ranking score for the product based at least in part on the corresponding feature score values and the set of weightings; and ranking the product among the plurality of products based at least in part on the ranking score.

9. The method of claim 7, wherein the historical metric values comprise one or more of the following: a conversion rate and a click-through rate.

10. The method of claim 7, wherein determining the plurality of feature score values corresponding to the set of ranking features associated with the query word corresponding to each product associated with each of the at least subset of the plurality of sample pairs includes:

extracting a set of attribute values corresponding to the set of ranking features associated with the product; and computing the plurality of feature score values for the product based at least in part on the set of attribute values.

11. The method of claim 7, wherein the set of ranking features associated with the query word is associated with a category to which the query word belongs.

12. The method of claim 7, wherein the historical user action data includes one or more of the following: access logs, purchase logs, or selection logs.

13. A computer program product, the computer program product being embodied in a non-transitory computer readable storage medium and comprising computer instructions for:

determining a plurality of sample pairs corresponding to a query word, wherein a sample pair of the plurality of sample pairs is associated with a first product and a second product responsive to the query word, wherein one of the first product and the second product is assigned a higher ranking priority than the other one of the first product and the second product based at least in part on historical user action data associated with the query word, wherein determining the plurality of sample pairs corresponding to the query word includes:

determining a plurality of products responsive to the query word based at least in part on the historical user action data associated with the query word;

determining a historical metric value for each product of the plurality of products based at least in part on the historical user action data associated with the query word;

determining a plurality of pairs of products from the plurality of products;

determining the plurality of sample pairs from the plurality of pairs of products, wherein each of the plurality of sample pairs meets a condition associated with the historical metric value; and assigning a higher priority to a product in each sample pair of the plurality of sample pairs based at least in part on respective historical metric values corresponding to the two products of the sample pair;

determining a plurality of feature score values corresponding to a set of ranking features associated with the query word for each product associated with each of at least a subset of the plurality of sample pairs;

determining a set of weightings corresponding to the set of ranking features based at least in part on the plurality of feature score values and ranking priority assignments corresponding to the at least subset of the plurality of sample pairs, wherein determining the set of weightings corresponding to the set of ranking features includes training a machine learning model based at least in part on the plurality of feature score values and indications of higher ranking priority or lower ranking priority corresponding to the two products of each sample pair of the plurality of sample pairs;

receiving a subsequent search request including the query word;

ranking at least the plurality of products responsive to the query word based at least in part on the set of weightings; and outputting one or more ranked product search results.

* * * * *